United States Patent
Matsuda et al.

(10) Patent No.: US 10,723,637 B2
(45) Date of Patent: Jul. 28, 2020

(54) LIQUID TREATMENT APPARATUS

(71) Applicant: Panasonic Intellectual Property Management Co., Ltd., Osaka (JP)

(72) Inventors: Genichiro Matsuda, Nara (JP); Takahiro Kitai, Hyogo (JP); Gaku Miyake, Osaka (JP); Yoshio Yamada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 128 days.

(21) Appl. No.: 16/082,208

(22) PCT Filed: Jan. 29, 2018

(86) PCT No.: PCT/JP2018/002741
§ 371 (c)(1),
(2) Date: Sep. 4, 2018

(87) PCT Pub. No.: WO2018/173485
PCT Pub. Date: Sep. 27, 2018

(65) Prior Publication Data
US 2019/0256385 A1    Aug. 22, 2019

(30) Foreign Application Priority Data

Mar. 21, 2017 (JP) ................................ 2017-054438

(51) Int. Cl.
*C02F 1/46* (2006.01)
*C02F 1/00* (2006.01)
*C02F 1/32* (2006.01)

(52) U.S. Cl.
CPC ............ *C02F 1/4608* (2013.01); *C02F 1/008* (2013.01); *C02F 1/32* (2013.01); *C02F 2303/04* (2013.01)

(58) Field of Classification Search
CPC ................ C02F 1/4608; C02F 1/46109; C02F 1/46123; C02F 2301/026; C02F 2303/04;
(Continued)

(56) References Cited

U.S. PATENT DOCUMENTS 3,942,018 A * 3/1976 Simpson ................. C02F 1/325
250/493.1
5,844,196 A   12/1998 Oakley
(Continued)

FOREIGN PATENT DOCUMENTS

JP    11-156553      6/1999
JP    2000-093967   4/2000
(Continued)

OTHER PUBLICATIONS

International Search Report of PCT application No. PCT/JP2018/002741 dated Apr. 3, 2018.

*Primary Examiner* — Lessanework Seifu
(74) *Attorney, Agent, or Firm* — Wenderoth, Lind & Ponack, L.L.P.

(57) ABSTRACT

A liquid treatment apparatus including: a tubular treatment tank whose end along a central axis is closed and sectional shape orthogonal to the central axis is a circular shape; a first electrode disposed on one end of the central axis of the treatment tank and having a bar shape; a second electrode disposed on the other end thereof; a power supply applying voltage between the first electrode and the second electrode; a rotation mechanism rotating the first electrode about a
(Continued)

central axis of the first electrode; and an air introduction portion introducing the liquid to the one end of the central axis of the treatment tank from a tangential direction of the circular sectional shape of the treatment tank, and causing liquid to swirl about the central axis of the treatment tank therein to generate a gas phase in a swirling flow of the liquid.

9 Claims, 15 Drawing Sheets

(58) Field of Classification Search
CPC ...... C02F 2305/023; C02F 2201/46175; B01J 19/088; B01J 2219/0894; B01J 2219/0877; B01J 2219/0809; B01J 2219/0869; B01J 2219/0818; B01J 2219/082; B01J 2219/0822; B01J 2219/0826

See application file for complete search history.

(56) References Cited

U.S. PATENT DOCUMENTS

| | | | |
|---|---|---|---|
| 6,187,154 B1* | 2/2001 | Yamaguchi | C02F 1/008 204/228.6 |
| 8,734,654 B2 | 5/2014 | Foret | |
| 2007/0267289 A1 | 11/2007 | Jabs et al. | |
| 2015/0122632 A1* | 5/2015 | Lynch | B01J 19/088 204/164 |
| 2015/0232353 A1 | 8/2015 | Denvir et al. | |
| 2016/0120013 A1 | 4/2016 | Imai | |
| 2016/0272518 A1 | 9/2016 | Zolezzi-Garreton | |

FOREIGN PATENT DOCUMENTS

| | | |
|---|---|---|
| JP | 2007-069108 | 3/2007 |
| JP | 2010-022991 | 2/2010 |
| JP | 2012-228644 | 11/2012 |
| JP | 2014-113517 | 6/2014 |
| JP | 2016-083658 | 5/2016 |
| JP | 2017-018944 | 1/2017 |

\* cited by examiner

US 10,723,637 B2

LIQUID TREATMENT APPARATUS

CROSS-REFERENCE TO RELATED APPLICATIONS

This application is a U.S. national stage application of the PCT International Application No. PCT/JP2018/002741 filed on Jan. 29, 2018, which claims the benefit of foreign priority of Japanese patent application 2017-054438 filed on Mar. 21, 2017, the contents all of which are incorporated herein by reference.

TECHNICAL FIELD

The disclosure relates to a liquid treatment apparatus that electrochemically treats a liquid. More specifically, the disclosure relates to a liquid treatment apparatus that treats liquid by simultaneously causing a decomposing and sterilizing action by generating plasma in the liquid and pollutants or bacteria contained in the liquid directly coming in contact with the plasma and a decomposing and sterilizing action by ultraviolet rays, radicals, or the like generated by plasma discharge.

BACKGROUND ART

FIG. 13 illustrates an example of a conventional liquid treatment apparatus. First electrode 801 and second electrode 802 are disposed in liquid 803 (for example, water), a high voltage pulse is applied between first electrode 801 and second electrode 802 from pulse power supply 804, and liquid 803 is vaporized to generate plasma 805. At this time, pollutants and the like contained in liquid 803 are decomposed by directly coming in contact with plasma 805. At the same time, for example, even in a case where components having oxidizing power such as a hydroxyl radical (OH radical) and hydrogen peroxide are generated and these components react with the pollutants and the like contained in liquid 803, the decomposition treatment progresses. It is known that OH radicals, in particular, have high oxidizing power among the radicals generated by generation of plasma 805 in water, and decomposition treatment of hardly decomposable organic compounds dissolved in liquid 803 can be performed.

However, in a case of the conventional liquid treatment apparatus, since not only a high applied voltage is required for vaporizing liquid 803 but also generation efficiency of plasma 805 is low, there is a problem that it takes a long time to treat liquid 803.

Accordingly, there is known a liquid treatment apparatus in which a gas introduced from the outside is interposed between both electrodes so as to improve the generation efficiency of the plasma while lowering the applied voltage (see PTL 1). In the liquid treatment apparatus (FIG. 14) described in PTL 1, gas 904 (for example, oxygen) is interposed between anode electrode 901 and cathode electrode 902 together with TREATMENT LIQUID 903, and then a pulse voltage is applied to between anode electrode 901 and cathode electrode 902. Plasma is generated in gas 904 by applying the pulse voltage, and decomposition treatment of TREATMENT LIQUID 903 progresses at the contact surface between the plasma and TREATMENT LIQUID 903. According to the liquid treatment described in PTL 1, the applied voltage can be reduced as compared with a case where gas is not interposed, and the plasma can be generated efficiently to treat the liquid.

CITATION LIST

Patent Literature

PTL 1: Japanese Patent Unexamined Publication No. 2000-093967

SUMMARY

According to an aspect of the disclosure, there is provided a liquid treatment apparatus including: a tubular treatment tank of which one end along a central axis is closed and a sectional shape orthogonal to the central axis is a circular shape, and which has a liquid introduction port by introducing the liquid from a tangential direction of the circular sectional shape to a side of the one end of the central axis, and causing liquid to swirl about the central axis to generate a gas phase in a swirling flow of the liquid; a first electrode which is disposed on the side of the one end of the central axis of the treatment tank and has a bar shape; a second electrode which is disposed on a side of the other end of the central axis of the treatment tank; a power supply which applies a voltage between the first electrode and the second electrode; and an electrode rotation device which rotates the first electrode about a central axis of the first electrode.

According to the liquid treatment apparatus according to the aspect of the disclosure, by rotating the first electrode about the central axis of the first electrode by the electrode rotation device, the tip of the first electrode can be worn on average about the central axis thereof, the plasma is stabilized, the plasma is efficiently generated, the liquid can be rapidly treated, the plasma can be stably generated for a long time, and the equipment can be operated for a long time. In addition, in the treatment tank of the liquid treatment apparatus, the liquid is vaporized in the swirling flow, and a pulse voltage is applied to the generated gas phase to generate plasma. Since it is unnecessary to vaporize the liquid by application of voltage, it is possible to generate plasma with less electric power, and it is possible to efficiently and rapidly treat the liquid.

DESCRIPTION OF EMBODIMENT

Figure 1:
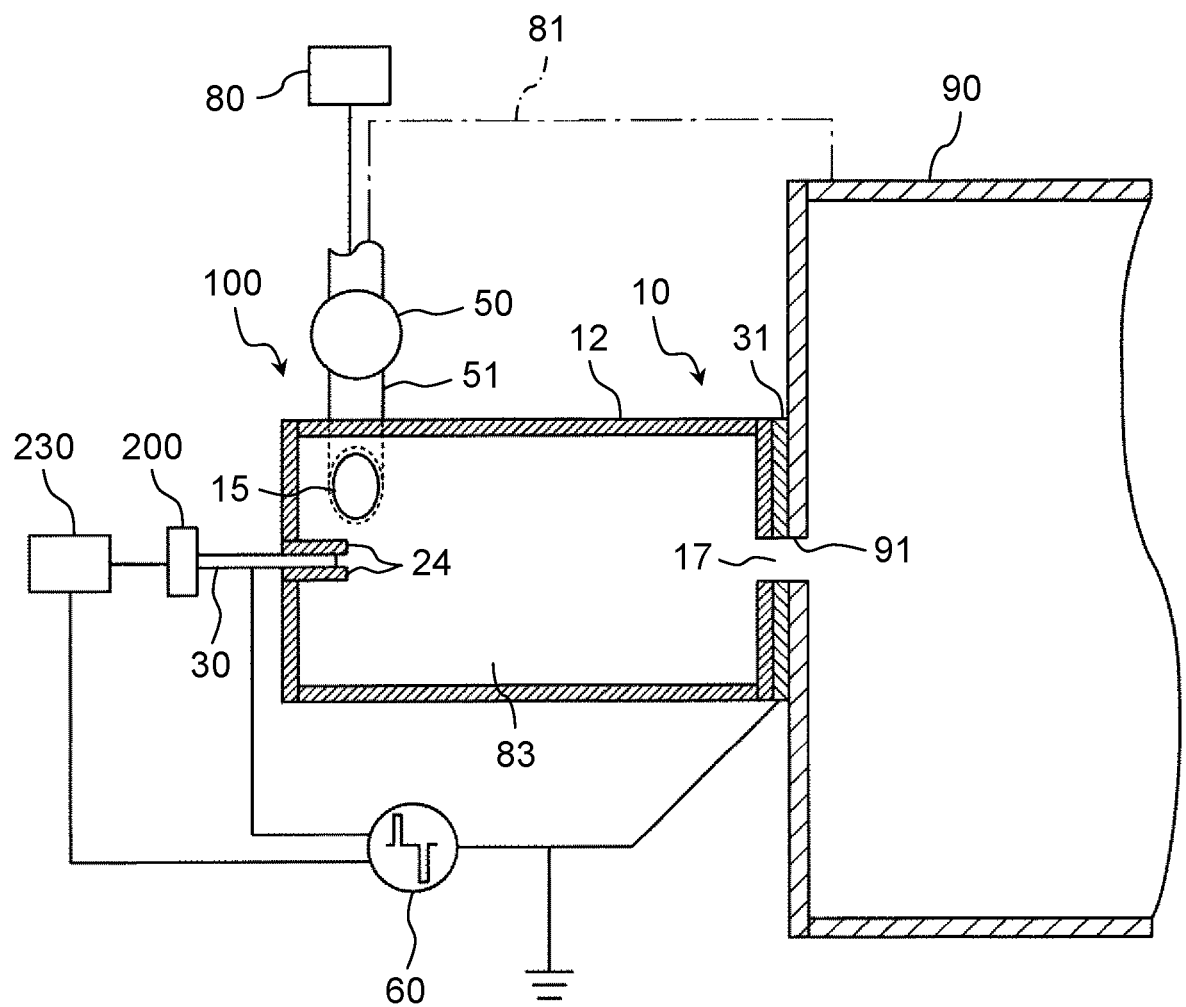
FIG. 1 is a side sectional view illustrating a configuration of a liquid treatment apparatus according to Exemplary embodiment 1 of the disclosure.

Prior to describing the Exemplary embodiment, conventional problems will be briefly described.

In the liquid treatment apparatus described in PTL 1, a bar-shaped electrode is used for one electrode. In such a liquid treatment apparatus, the bar-shaped electrode is attached in a state of being slightly inclined with respect to a discharge direction or slightly biased, so that when plasma is generated for a long time between the electrodes, the tip of the bar-shaped electrode is worn out in a biased shape. If the bias of the tip due to wear becomes large, since the plasma cannot be generated stably eventually, a problem arises that the equipment cannot be operated for a long time.

In view of the above, an object of the disclosure is to provide a liquid treatment apparatus that can efficiently generate plasma to rapidly treat a liquid and stably generate plasma for a long period of time.

Exemplary Embodiment 1

Hereinafter, liquid treatment apparatus 100 according to the Exemplary embodiment of the disclosure will be described in detail with reference to the drawings. Identical or corresponding portions in the drawings are denoted by the same reference numerals, and description thereof will not be repeated. So as to make the explanation easy to understand, in the drawings referred to below, the configuration is simplified or schematically illustrated, and some constituent members are omitted. In addition, the dimensional ratio between the constituent members illustrated in each drawing does not necessarily indicate the actual size ratio.

[Overall Configuration]

First, the overall configuration of liquid treatment apparatus 100 according to Exemplary embodiment 1 will be described. FIG. 1 is a side sectional view illustrating a configuration of liquid treatment apparatus 100 according to Exemplary embodiment 1 of the disclosure. In the following drawings, arrow F indicates a front direction of liquid treatment apparatus 100 and arrow B indicates a rear direction thereof. Arrow U indicates an upper direction thereof and arrow D indicates a lower direction thereof. Arrow R indicates a right direction thereof as viewed from the rear direction, and arrow L indicates a left direction thereof as viewed from the rear direction.

Liquid treatment apparatus 100 illustrated in FIG. 1 indicates a state of being connected to storage tank 90. Liquid treatment apparatus 100 treats a liquid by discharging in a liquid. In Exemplary embodiment 1, as an example of a TREATMENT LIQUID, a case where liquid L1 in which the pollutant is dissolved is treated will be described.

In storage tank 90, a treatment liquid treated by liquid treatment apparatus 100 is stored.

Liquid treatment apparatus 100 includes at least treatment tank 12 having introduction portion 15 functioning as an example of a liquid introduction port, first electrode 30, second electrode 31, power supply 60, and rotation mechanism 200 as an example of an electrode rotation device. More specifically, liquid treatment apparatus 100 includes apparatus main body 10, liquid supplier 50, and power supply 60. Apparatus main body 10 includes treatment tank 12, introduction portion 15, discharge unit 17, first electrode 30, and second electrode 31.

Treatment tank 12 is a tubular tank that treats liquid (for example, water) L1 introduced therein. The front sectional shape of treatment tank 12 is circular (see FIG. 3). Introduction portion 15 is disposed at one closed end side of central axis X1 of treatment tank 12 and introduces liquid L1 to treatment tank 12, for example, from a tangential direction having a circular sectional shape orthogonal to central axis X1 of treatment tank 12. Introduction portion 15 communicates with liquid supplier 50 via pipe 51. Discharge unit 17 is disposed at the other end of treatment tank 12 and discharges treatment liquid L2 treated in treatment tank 12 from treatment tank 12. In Exemplary embodiment 1, discharge unit 17 is disposed on the other end side of central axis X1 of treatment tank 12 and is connected to intake port 91 of storage tank 90. Treatment liquid L2 discharged from discharge unit 17 is stored in storage tank 90.

First electrode 30 is a bar-shaped electrode in which at least an inner end portion is disposed inside one end of treatment tank 12. As an example, first electrode 30 protrudes from the center of the inner wall of one end of treatment tank 12 into treatment tank 12 along the longitudinal direction, for example along central axis X1. As a material of first electrode 30, for example, tungsten is used.

Second electrode 31 is disposed outside a wall at the other end of treatment tank 12 and is disposed in the vicinity of discharge unit 17.

Power supply 60 is connected to first electrode 30, and second electrode 31 is grounded. A high voltage pulse voltage is applied to first electrode 30 and second electrode 31 by power supply 60.

As one example, liquid supplier 50 is a pump that supplies liquid (for example, water) L1 into treatment tank 12. Liquid supplier 50 is connected to pipe 51. One end of pipe 51 is connected to introduction portion 15 as an inner opening disposed in the vicinity of the inner wall at one end of treatment tank 12 and the other end of pipe 51 is connected in a form in which storage water containing the treatment liquid of a liquid supply source (for example, water tank 80) or storage tank 90 is circulated (see pipe 81 for circulation indicated by one-dot chain line in FIG. 1).

Power supply 60 applies a high voltage pulse voltage between first electrode 30 and second electrode 31. Power supply 60 can apply a so-called bipolar pulse voltage that alternately applies a positive pulse voltage and a negative pulse voltage.

Rotation mechanism 200 is attached to first electrode 30, and first electrode 30 can be rotated with respect to treatment tank 12 about central axis 30c (see FIG. 7) of first electrode 30. Rotation mechanism 200 is configured with a motor capable of holding first electrode 30 and capable of controlling the rotation angle. If necessary, for example, under the control of control device 230, after power is turned on, it is possible to rotate first electrode 30 by rotation mechanism 200 at a predetermined angle for a predetermined time or at a predetermined time interval. As an example, rotation mechanism 200 is driven and controlled by control device 230, and under the control of control device 230, first electrode 30 can be rotated by rotation mechanism 200 by a predetermined angle at a predetermined time or at a predetermined interval from the application of the voltage at power supply 60.

Storage tank 90 is a tank which shears the treatment liquid discharged from liquid treatment apparatus 100, that is, reformed components such as OH radicals, generates microbubbles or nanobubbles containing the reformed components, and diffuses the microbubbles or nanobubbles into the treatment liquid (for example, water). Specifically, storage tank 90 has a sectional area larger than the sectional area of the opening of discharge unit 17 of treatment tank 12 therein, and shears the reformed components discharged from discharge unit 17 into storage tank 90 in storage tank 90, generates microbubbles containing the reformed component, or microbubbles and nanobubbles in storage tank 90 and diffuses microbubbles containing the reformed component, or microbubbles and nanobubbles into the water to produce a treatment liquid. Therefore, storage tank 90 functions as a microbubble generation tank. As storage tank 90, the treatment liquid which can sterilize surely can be generated in storage tank 90 by at least securing the inner diameter or one side that is at least twice the inner diameter dimension of the opening of discharge unit 17 of treatment tank 12.

[Apparatus Main Body]

Figure 2:
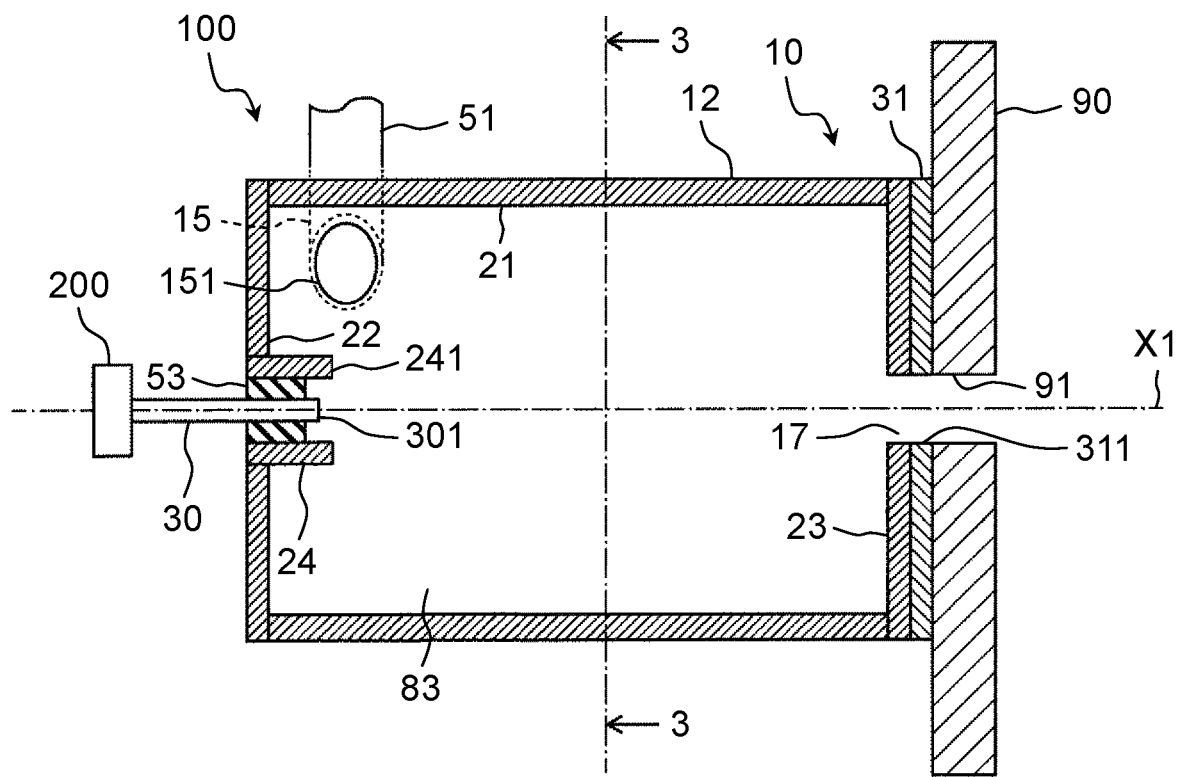
FIG. 2 is a side sectional view illustrating an apparatus main body.
Figure 2:
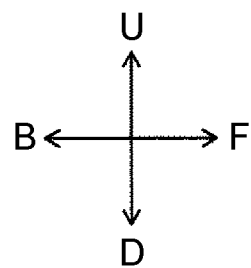

Next, apparatus main body 10 will be described in detail. FIG. 2 is a side sectional view illustrating apparatus main body 10.

Treatment tank 12 has first inner wall 21, second inner wall 22, and third inner wall 23. The material of treatment tank 12 may be an insulator or a conductor. In a case of the conductor, it is necessary to interpose an insulator between first electrode 30 and second electrode 31. First inner wall 21 is a tubular wall portion. Second inner wall 22 is provided at the left end portion of first inner wall 21 in FIG. 2. Third inner wall 23 is provided at the right end portion of first inner wall 21 in FIG. 2. Second inner wall 22 and third inner wall 23 are substantially circular in a side view. First inner wall 21, second inner wall 22, and third inner wall 23 constitute substantially columnar accommodation space 83 in treatment tank 12. A central axis of first inner wall 21, that is, an imaginary central axis of a substantially columnar accommodation space 83 configured in treatment tank 12 is set to as central axis X1.

Tubular electrode support tube 24 protruding into accommodation space 83 is provided at the center on second inner wall 22. Electrode support tube 24 is tubular and extends in the right direction. Electrode support tube 24 is disposed so that central axis thereof coincides with central axis X1. First electrode 30 is supported inside electrode support tube 24 via insulator 53. First electrode 30 has a bar shape, and insulator 53 is disposed around first electrode 30. Therefore, first electrode 30 is disposed so that the longitudinal axis coincides with central axis X1. It is configured so that the inner end surface of right end portion 301 of first electrode 30 further protrudes to accommodation space 83 than the inner end surface of insulator 53 and inner end surface 241 of electrode support tube 24 further protrudes to accommodation space 83 than the inner end surface of right end portion 301 of first electrode 30.

Rotation mechanism 200 is attached to first electrode 30 outside treatment tank 12 and first electrode 30 can be rotated about central axis 30c of first electrode 30 by a predetermined angle with respect to treatment tank 12 for a predetermined time or at a predetermined time interval. Center axis 30c of first electrode 30 may be the same as or different from central axis X1.

Figure 3:
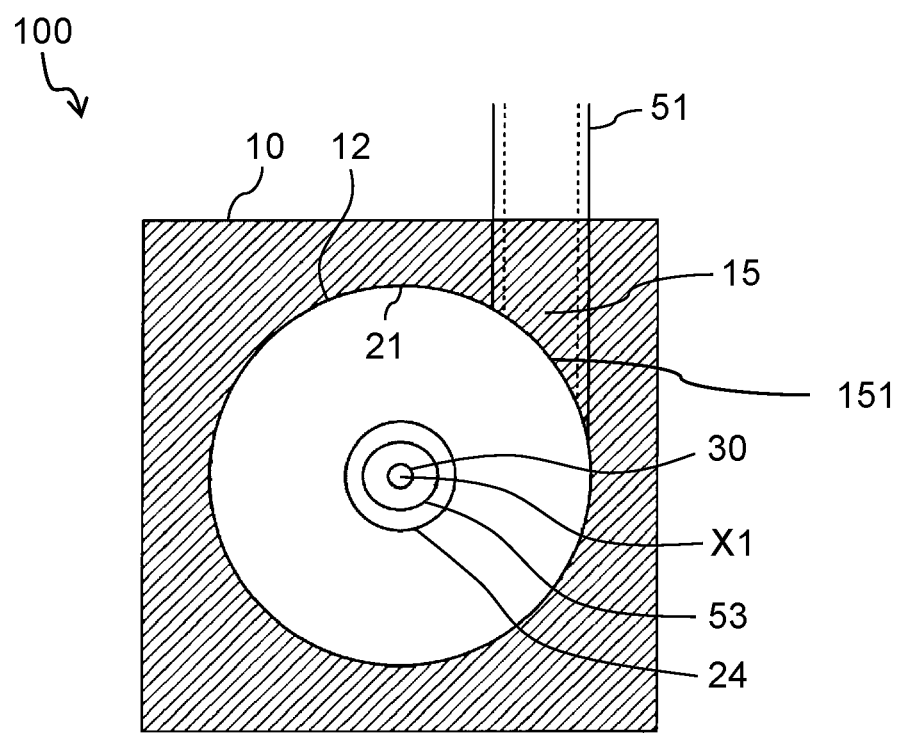
FIG. 3 is a sectional view taken along line 3-3 of FIG. 2.
Figure 3:
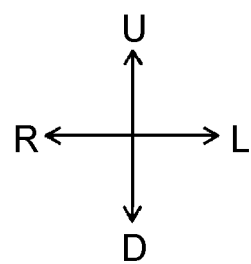

Introduction portion 15 penetrates apparatus main body 10, and one opening end 151 is formed in first inner wall 21. In the side view, introduction portion 15 is disposed at a position adjacent to second inner wall 22. In addition, FIG. 3 is a sectional view taken along line 3-3 of FIG. 2. Introduction portion 15 is disposed on the wall surface of first inner wall 21.

Discharge unit 17 penetrates the center portion of third inner wall 23. Discharge unit 17 is formed such that central axis thereof coincides with central axis X1.

Second electrode 31 is a plate-shaped metal member, and opening portion 311 is formed on the center portion thereof. Opening portion 311 has a circular shape and central axis thereof coincides with central axis X1.

[Operation]

Figure 4:
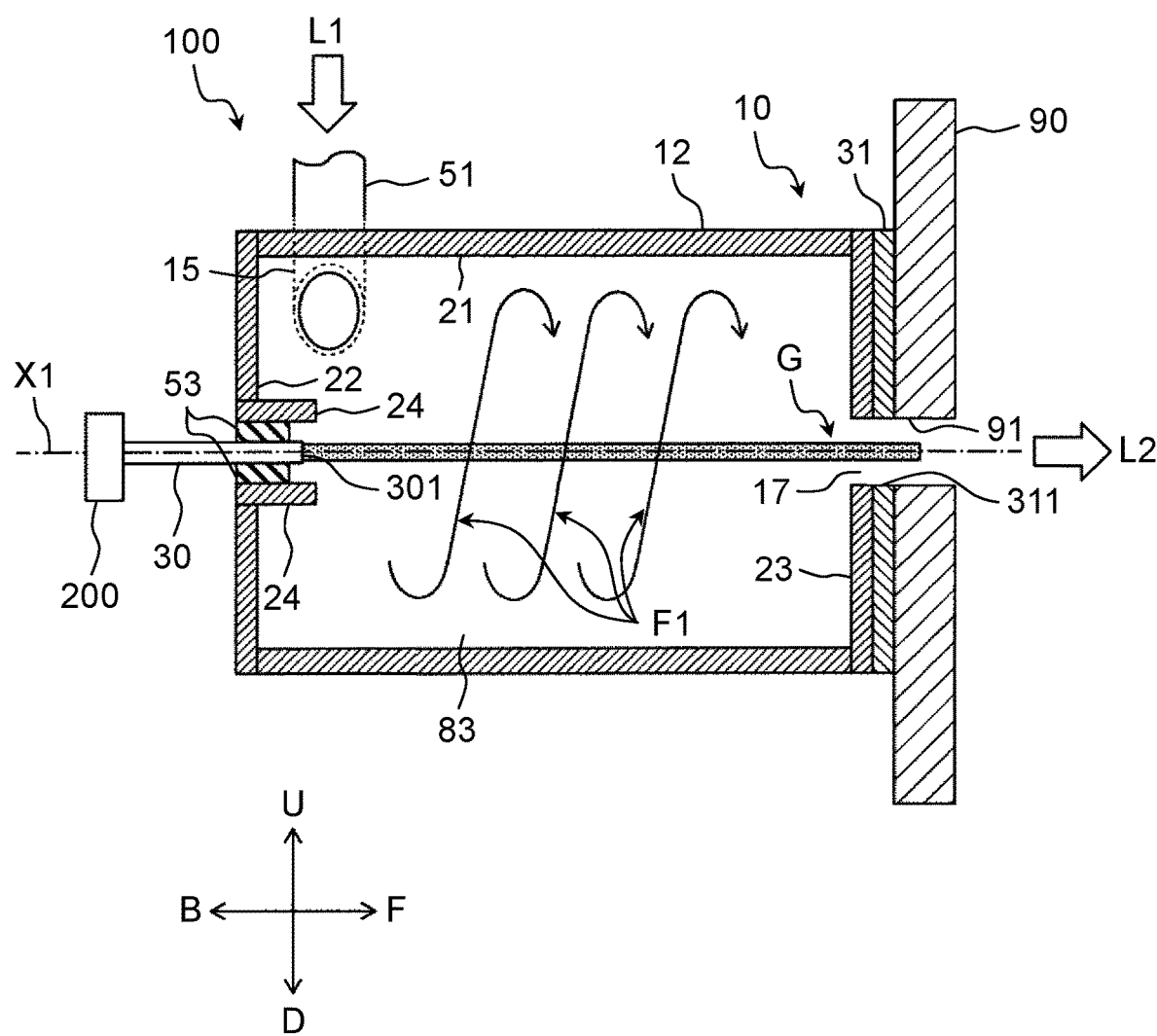
FIG. 4 is a side sectional view illustrating a state where a swirling flow is generated in a treatment tank and no voltage is applied.

Next, the operation of liquid treatment apparatus 100 will be described. Hereinafter, for the sake of convenience of the explanation, a state (FIG. 4) where a gas phase is generated inside treatment tank 12 and a state (FIG. 5A and FIG. 5B) where a pulse voltage is applied to gas phase G to generate plasma P will be described separately in separate figures. FIG. 4 is a side sectional view illustrating a state where swirling flow F1 is generated in treatment tank 12 and no pulse voltage is applied.

First, as illustrated in FIG. 4, when liquid (for example, water) L1 is introduced from introduction portion 15 to treatment tank 12 at a predetermined pressure, liquid L1 moves toward the right side in FIG. 4 from introduction portion 15 while generating swirling flow F1 about central axis X1 along first inner wall 21. Swirling flow F1 that moves to the right side in FIG. 4 while swirling moves toward discharge unit 17.

Due to swirling flow F1, the pressure in the vicinity of central axis X1 drops to the saturated water vapor pressure or less, a portion of liquid L1 vaporizes, and gas phase G is generated in the vicinity of central axis X1. Gas phase G is generated in the vicinity of the swirling center, specifically, from right end portion 301 of first electrode 30 to the vicinity of opening portion 311 of second electrode 31 along central axis X1. In addition, gas phase G is swirling in the same direction as swirling flow F1 by swirling flow F1 in contact therewith. Gas phase G is sheared by microbubbles, or microbubbles and nanobubbles by being subjected to the resistance of the liquid in storage tank 90 in the vicinity of discharge unit 17, and diffused into the liquid in storage tank 90.

Figure 5A:
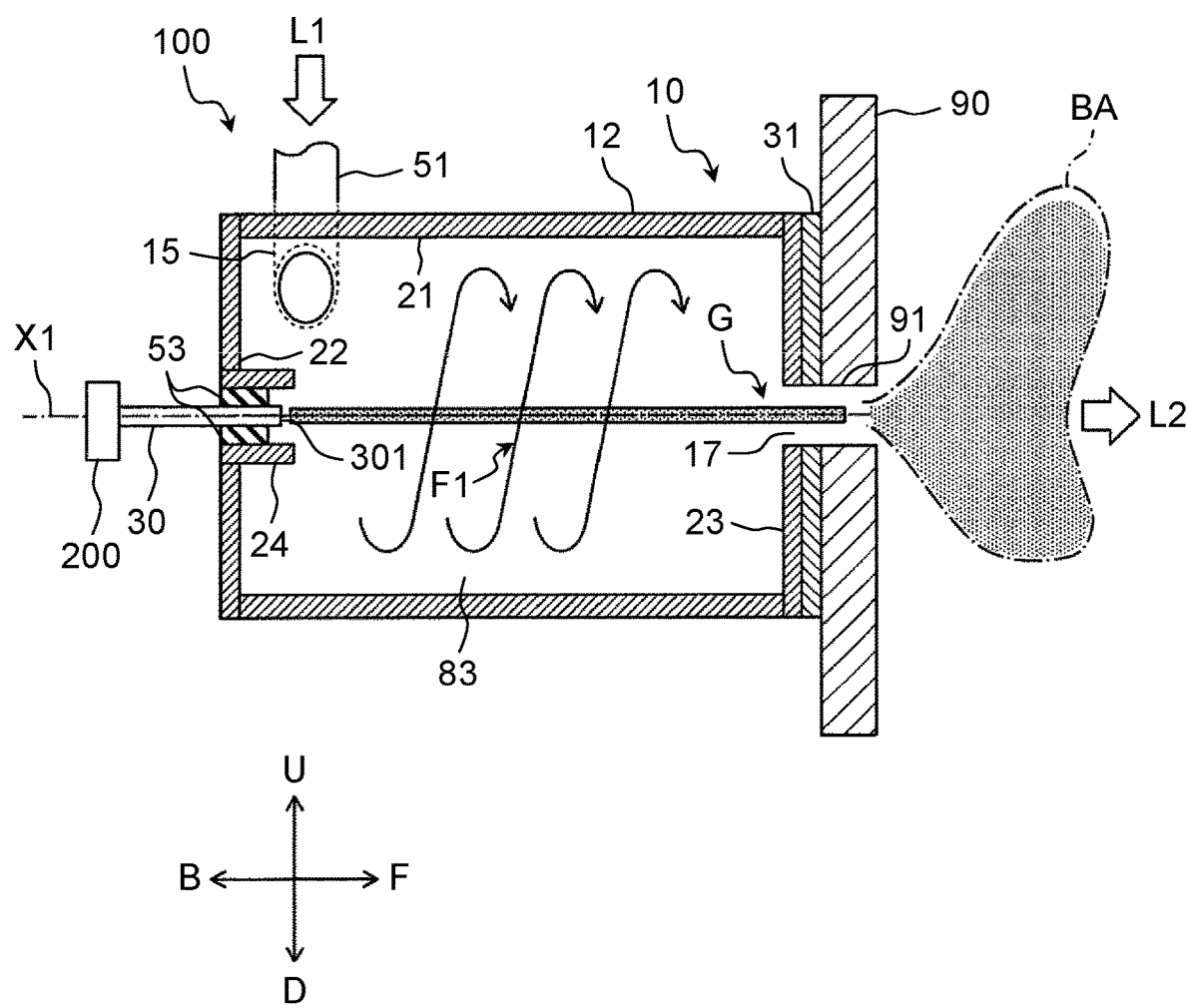
FIG. 5A is a side sectional view illustrating a state where a swirling flow is generated in the treatment tank and a voltage is applied.
Figure 5B:
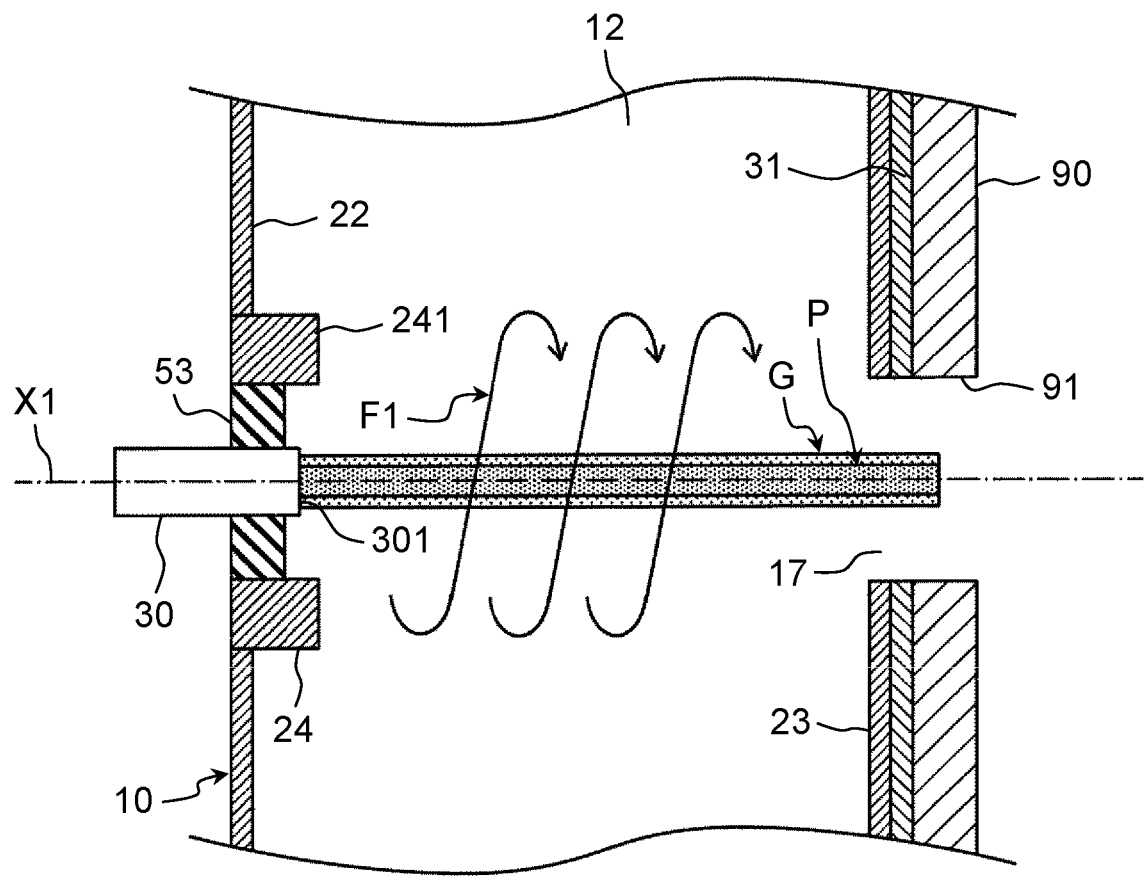
FIG. 5B is a partially enlarged view illustrating a state where plasma is generated in the gas phase of FIG. 5A.
Figure 5B:
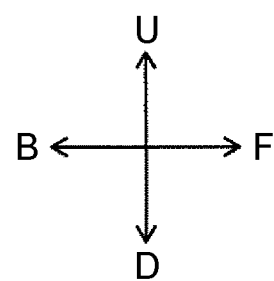

FIG. 5A is a side sectional view illustrating a state where swirling flow F1 is generated in treatment tank 12 and a pulse voltage is applied. FIG. 5B is an enlarged view illustrating a state where plasma P is generated in gas phase G. As illustrated in FIG. 5A, in a state where gas phase G vaporized from liquid L1 is generated along central axis X1 from first electrode 30 to the vicinity of second electrode 31, a high voltage pulse voltage is applied between first electrodes 30 and second electrode 31 by power supply 60. When a high voltage pulse voltage is applied between first electrode 30 and second electrode 31, plasma P is generated in gas phase G (see FIG. 5B) to generate radicals (OH radicals or the like) or ions. The radicals or ions dissolve from gas phase G toward swirling flow F1 side to decompose the pollutant dissolved in the solution. In addition, plasma P in gas phase G in the vicinity of discharge unit 17 receives a resistance of the liquid in storage tank 90, thereby generating a large amount of bubbles BA containing OH radicals and the like. In this manner, treatment liquid L2 in a state of being treated with OH radicals or the like generated by plasma P and containing bubbles BA containing OH radicals or the like is discharged from discharge unit 17 toward storage tank 90.

By the operation described above, it is possible to efficiently generate plasma P and rapidly treat liquid L1.

Figure 6:
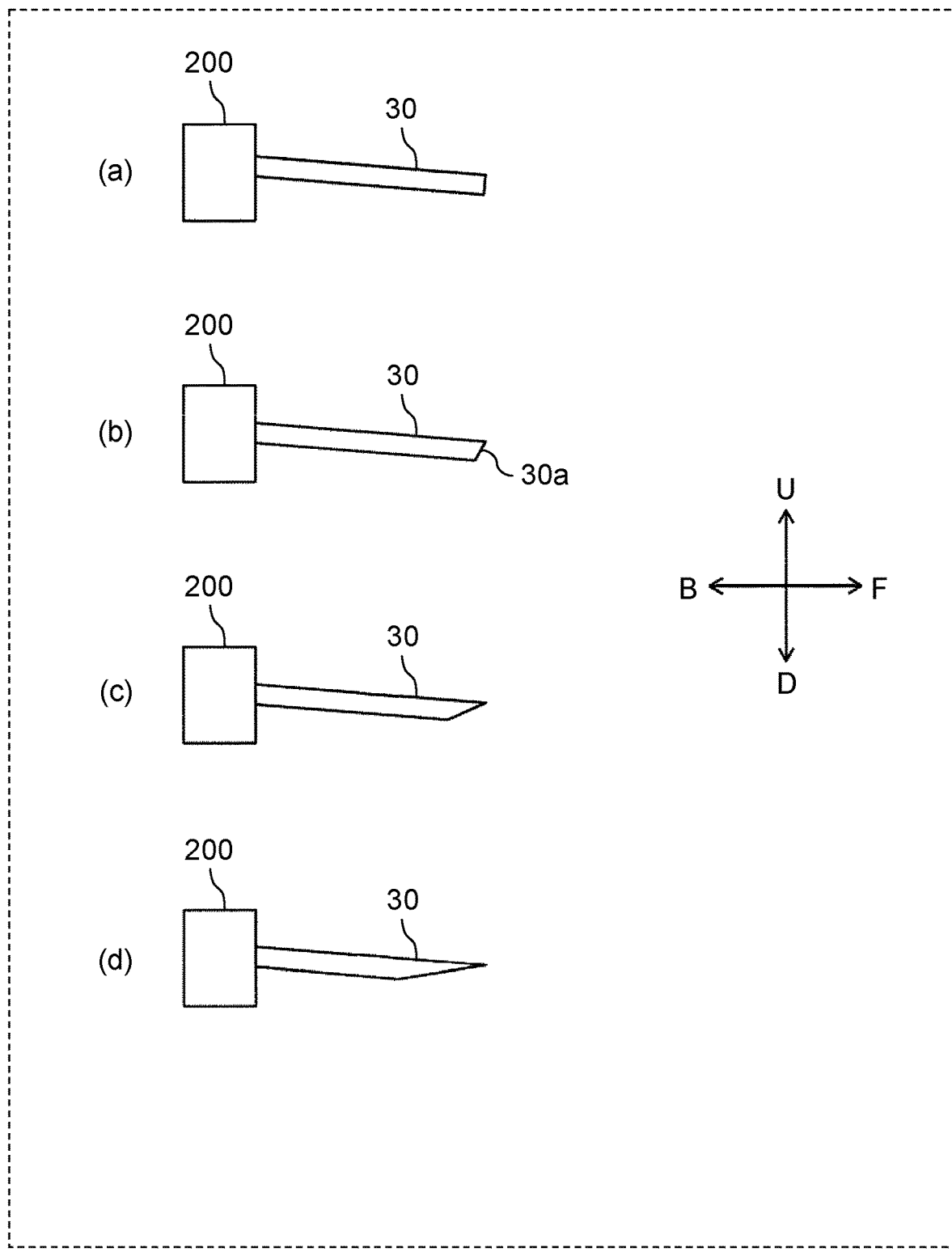
FIG. 6 is a view illustrating a state where wear of a first electrode progresses.

However, when first electrode 30 is attached in a state of being slightly inclined from central axis X1 or in an eccentric state, a phenomenon occurs in which first electrode 30 is biased and worn. FIG. 6 is a view illustrating a state where wear of first electrode 30 progresses. (a) of FIG. 6 illustrates an initial stage before generation of plasma. From this state, when plasma P is generated and liquid L1 is treated, first electrode 30 is biased and worn and tip portion 30a is sharpened, as illustrated in (b) of FIG. 6. When plasma P continues to be generated in this state, the bias becomes larger and becomes a state of being illustrated in (c) of FIG. 6, finally first electrode 30 is remarkably biased and worn as illustrated in (d) of FIG. 6, gas phase G is also eccentric, and plasma generation becomes unstable. So as to prevent such bias and wear of first electrode 30, it is valid to rotate first electrode 30 about central axis 30c of first electrode 30 by a predetermined angle for each predetermined time by rotation mechanism 200.

Figure 7:
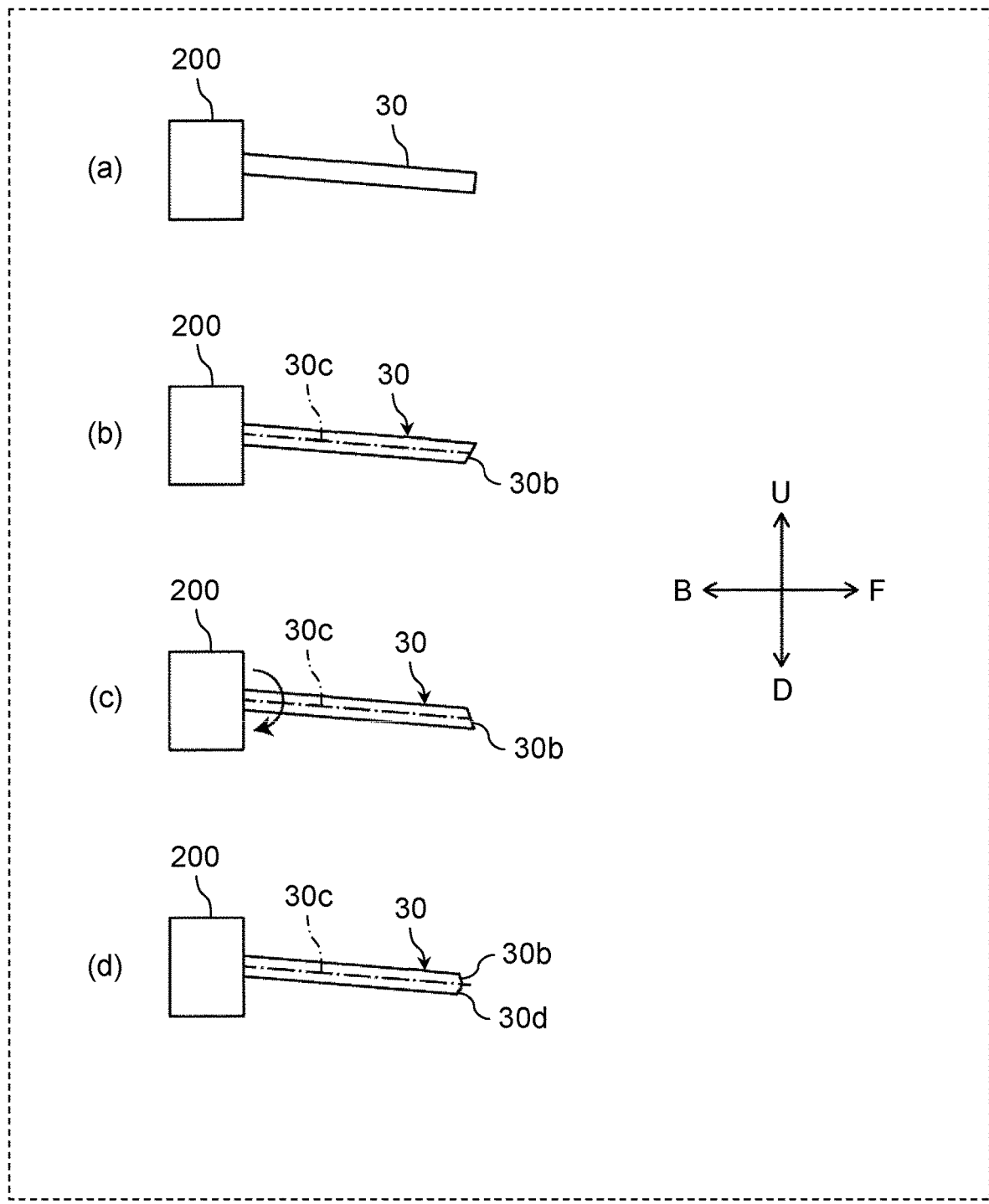
FIG. 7 is a view illustrating an effect of preventing the first electrode from being biased and worn by a rotation mechanism.

FIG. 7 is a diagram illustrating the effect of preventing first electrode 30 from being biased and worn due to first electrode 30 being rotated by rotation mechanism 200. In a state where first electrode 30 is inclined downward in the initial state of (a) of FIG. 7 when plasma P is generated for a long time, lower side 30b of the tip portion of first electrode 30 is worn, as illustrated in (b) of FIG. 7. Therefore, as illustrated in (c) of FIG. 7, in a state where first electrode 30 is rotated by a predetermined angle, for example, 180 degrees by rotation mechanism 200, and the worn portion of lower side 30b of the tip portion of first electrode 30 is brought to the upper side, when plasma P is generated for a long time, as illustrated in (d) of FIG. 7, an opposite side 30d of the tip portion of first electrode 30 is worn and is further flattened than that of (c) of FIG. 7.

Figure 8:
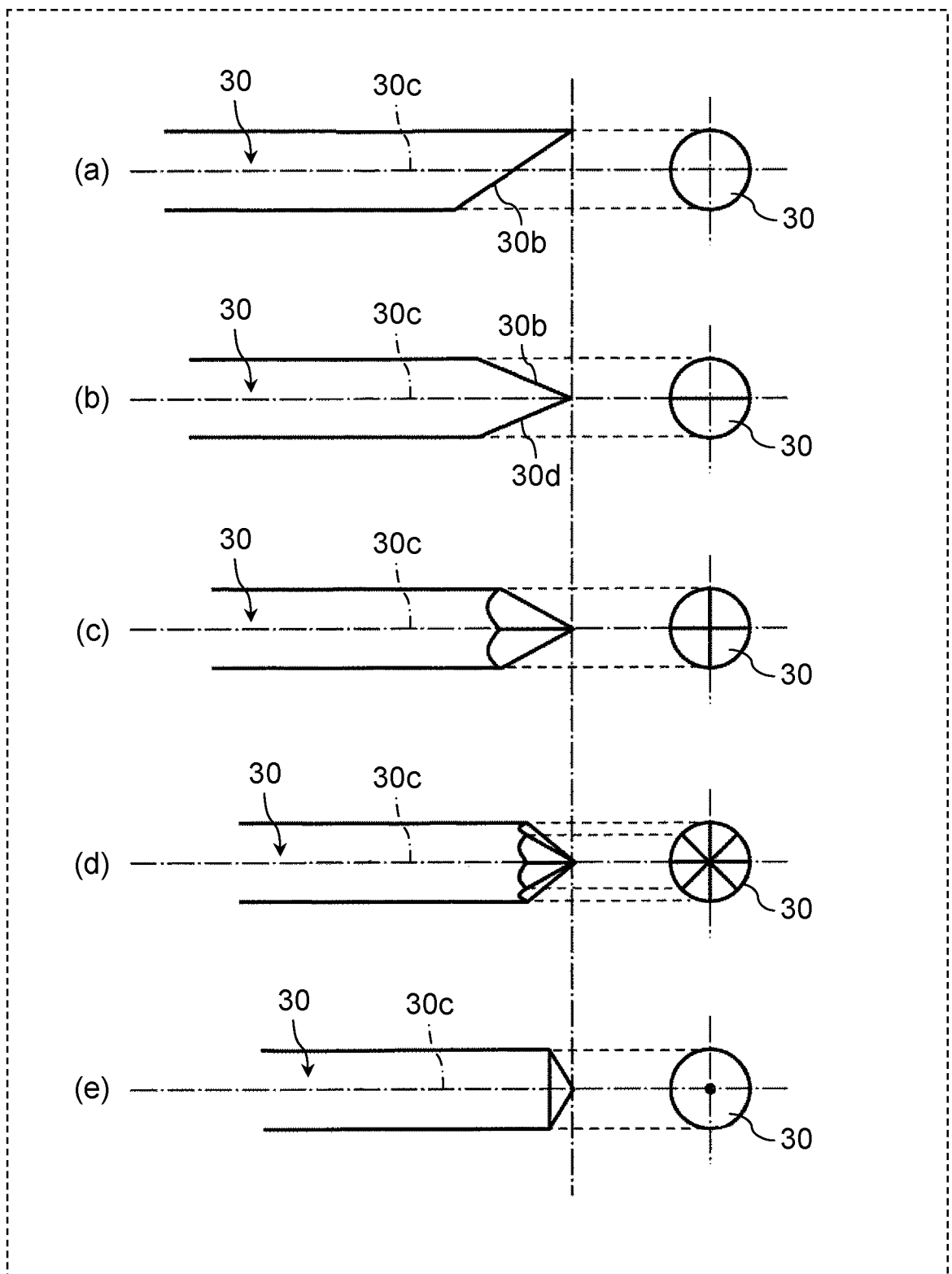
FIG. 8 is a view illustrating a difference in wear shape of a first electrode due to a difference in a rotation angle and a rotation interval of the rotation mechanism.

FIG. 8 is a view illustrating a difference in wear shape of first electrode 30 due to a difference in a rotation angle and a rotation interval of rotation mechanism 200. In (a)-(e) of FIG. 8, the total time of generating plasma P is the same, and each of the rotation operations is performed for each regular time. (a) of FIG. 8 illustrates a case where first electrode 30 is not rotated, (b) of FIG. 8 illustrates a case where 180° rotation thereof is performed once, (c) of FIG. 8 illustrates a case where 90° rotation thereof is performed three times, (d) of FIG. 8 illustrates a case where the 45° rotation thereof is performed seven times, and (e) of FIG. 8 illustrates a case where plasma P is generated always, that is, while continuously rotating. In (a) of FIG. 8, only one side of the tip portion 30a of the bar electrode which is first electrode 30 is worn, but in (b) of FIG. 8, both sides of the bar electrode are worn and the tip has a wedge shape. In (c) of FIG. 8 where the 90° rotation thereof is performed three times, the four surfaces are worn and the sharpness of the tip becomes small. In (d) of FIG. 8, the rotation angle is 45 degrees, and the sharpness of the tip is further reduced. In (e) of FIG. 8, the sharpness of the tip is the smallest and the tip shape is also conical in a case of being rotated at all times (for example, during plasma generation period). In this way, by reducing one rotation angle of first electrode 30 and frequently rotating the first electrode, it is possible to further suppress the sharpness of the tip, and as a result, the eccentricity of gas phase G can be minimized and thus plasma treatment for a long time can be performed.

According to Exemplary embodiment 1 described above, by rotating first electrode 30 about the central axis of first electrode 30 by rotation mechanism 200, tip portion 30a of first electrode 30 can be worn on the average about central axis 30c thereof to stabilize plasma P, plasma P can be generated efficiently, liquid L1 can be rapidly treated, plasma P can be stably generated for a long period of time, and the equipment can be operated for a long time. In other words, a phenomenon which occurs by first electrode 30 being attached in a state of being slightly inclined from central axis X1 or in an eccentric state and being biased and worn due to the generation of the plasma for a long time is suppressed by rotating first electrode 30 around central axis 30c thereof and it is possible to stably generate plasma P for a long time. In addition, in treatment tank 12 of liquid treatment apparatus 100, since liquid L1 is vaporized in swirling flow F1 and a pulse voltage is applied to generated gas phase G to generate plasma P, plasma P can be efficiently generated so that the treatment of liquid L1 can be performed quickly.

Figure 9:
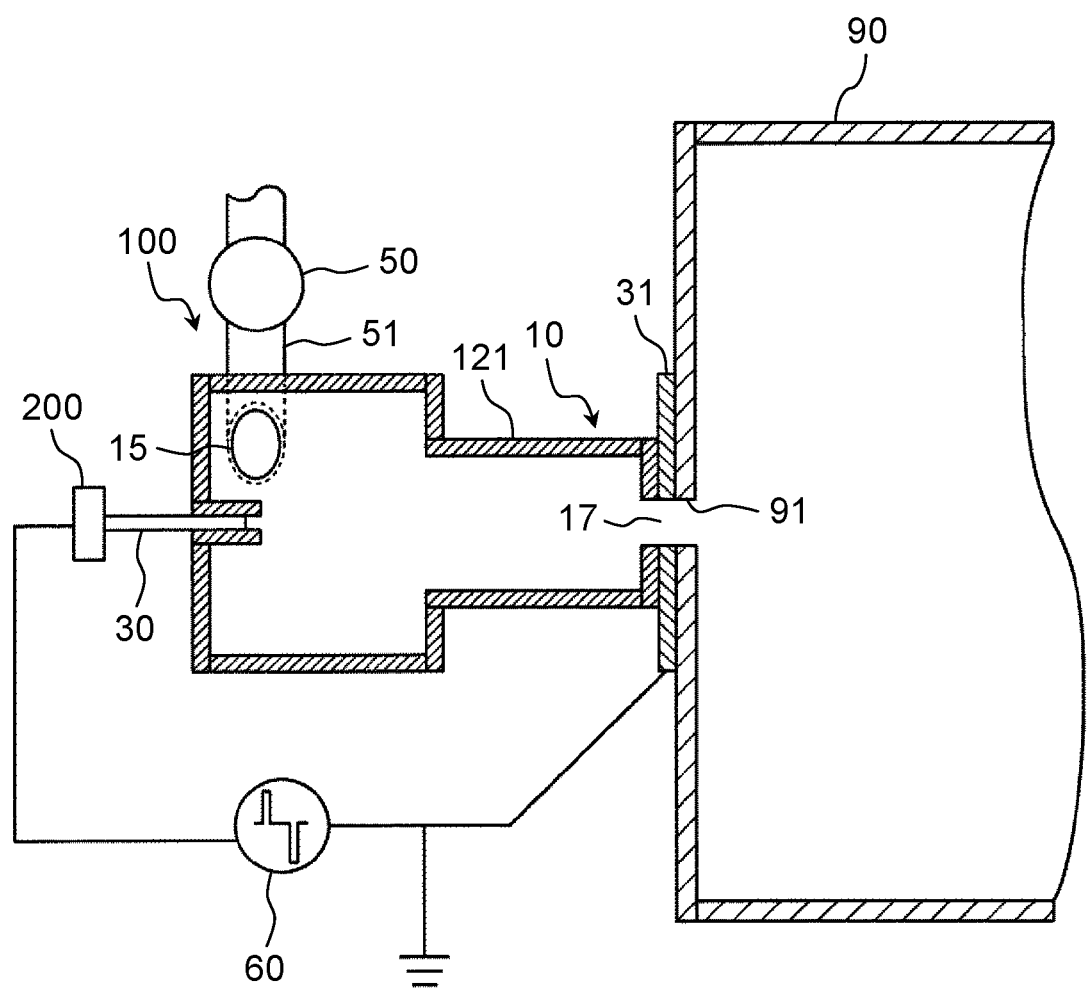
FIG. 9 is a diagram illustrating a treatment tank combining cylinders having different radii.
Figure 10:
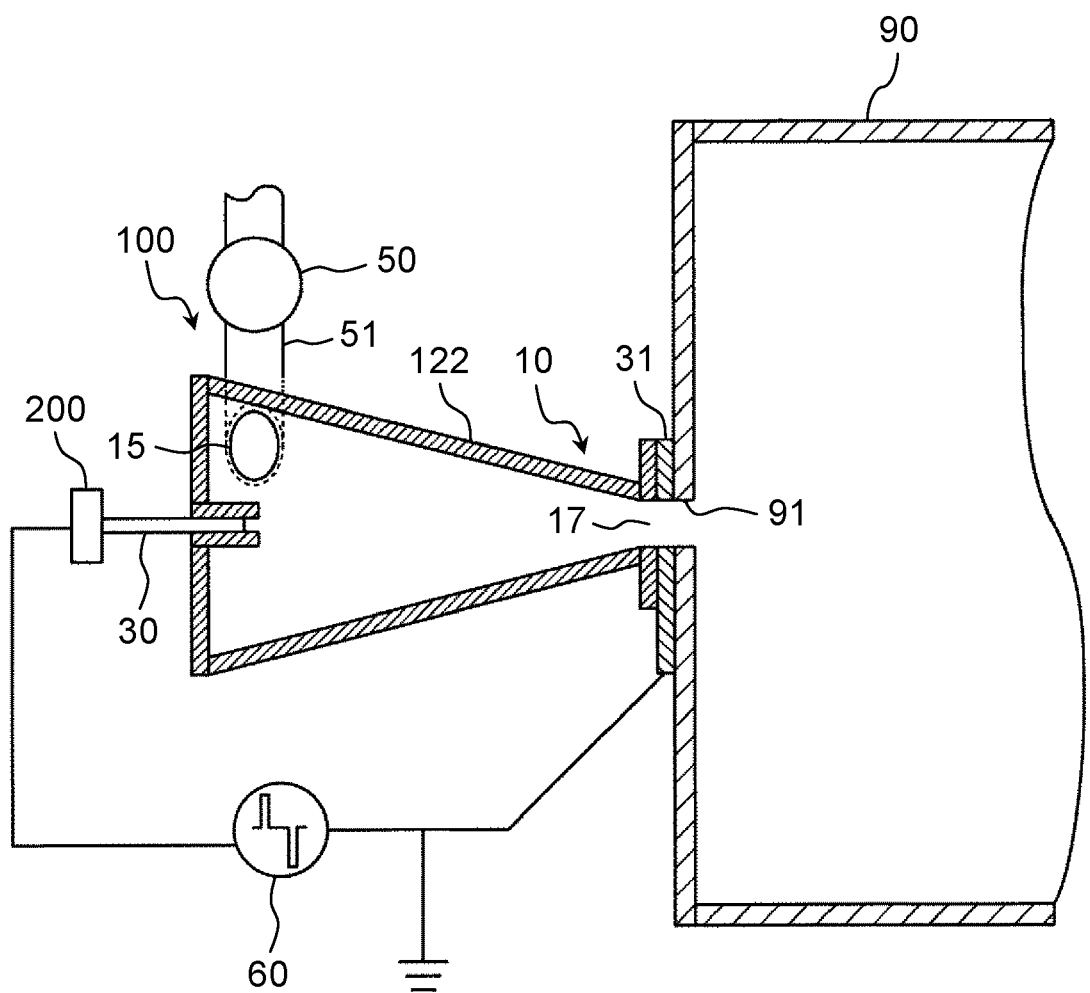
FIG. 10 is a diagram illustrating a conical treatment tank.

In the above description, although treatment tank 12 has a simple cylindrical shape, as long as the treatment tank is a tubular treatment tank in which one end portion of one side of central axis X1 has a circular closed sectional shape, treatment tank 12 can have various shapes. For example, as illustrated in FIG. 9, the same effect can be obtained even in treatment tank 121 combining cylinders having different radii. In FIG. 9, the radius of the sectional area on the side of the liquid introduction portion in treatment tank 121 is larger than the radius of the sectional area on the side of the liquid discharge unit. Alternatively, the same effect can be obtained even in conical treatment tank 122 illustrated in FIG. 10. Preferably, so as to prevent swirling flow F1 from sliding in forward direction F, as illustrated in FIG. 10, a conical shape in which the inner diameter of the section continuously decreases is preferable.

Modification Example

Figure 11:
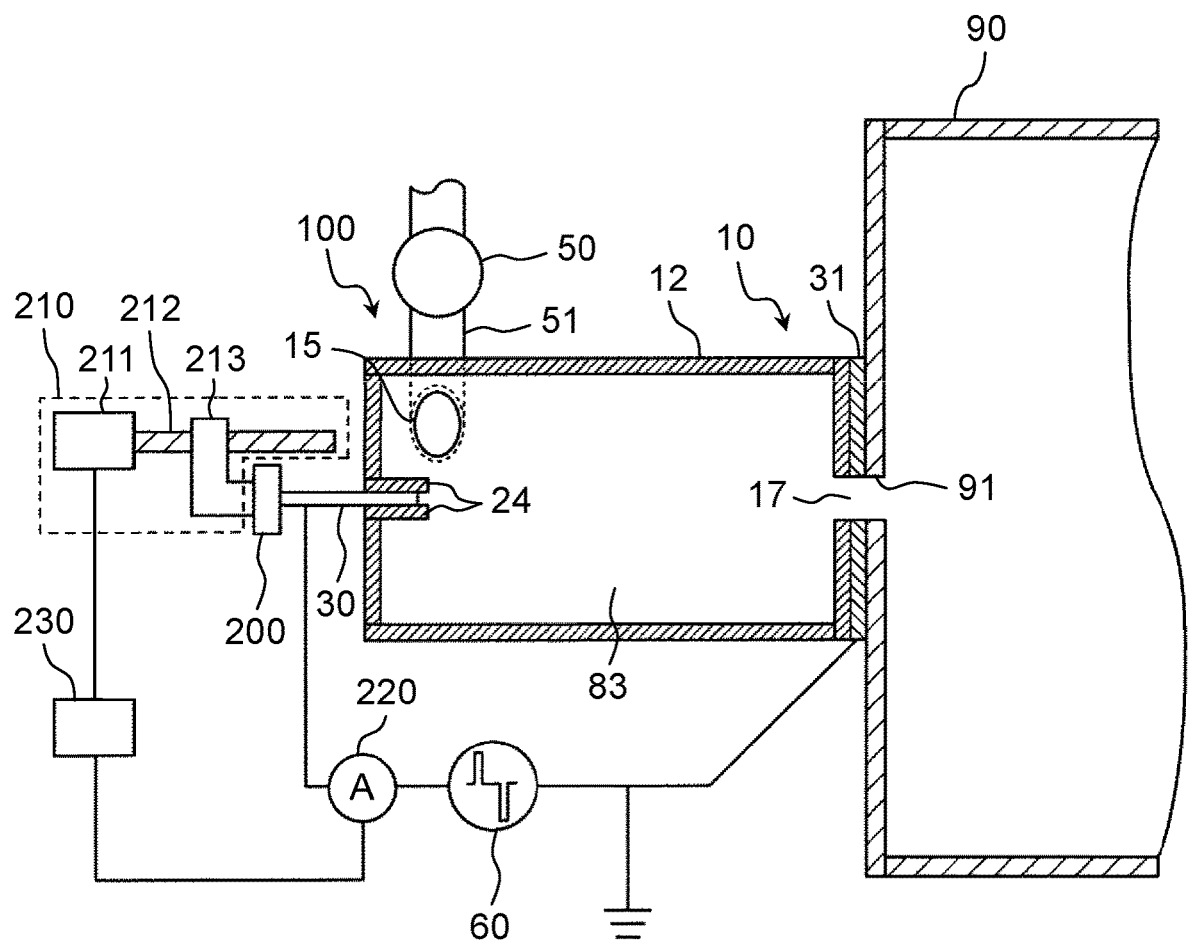
FIG. 11 is a side sectional view illustrating a modification example of an apparatus main body.
Figure 11:
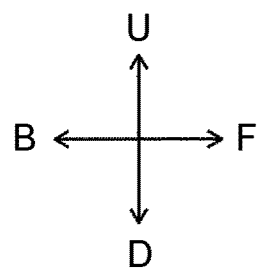

In Exemplary embodiment 1, although first electrode 30 is only rotated by rotation mechanism 200, as illustrated in FIG. 11, electrode moving device 210, ammeter 220, and control device 230 are provided, and further, the distance between first electrode 30 and second electrode 31 may be adjustable.

Ammeter 220 is connected between first electrode 30 and second electrode 31.

Electrode moving device 210 changes the distance between first electrode 30 and second electrode 31 based on the current value measured by ammeter 220. More specifically, electrode moving device 210 includes, for example, motor 211, ball screw 212 which is connected to motor 211 and driven to rotate in the forward and reverse directions, and movable body 213 which meshes with ball screw 212, holds first electrode 30, and can advance and retract in the axial direction of first electrode 30. Therefore, control device 230 drives and controls motor 211 based on a current value measured by ammeter 220, so that ball screw 212 rotates in the forward and rearward directions to move movable body 213 back and forth, whereby first electrode 30 can be taken in and out of treatment tank 12. For example, when control device 230 determines that the current waveform output from ammeter 220 is changed from the initial state, this state means that first electrode 30 is worn. Therefore, by giving a control command to electrode moving device 210 by control device 230 and inserting first electrode 30 into treatment tank 12 by electrode moving device 210, the distance between first electrode 30 and second electrode 31 is controlled. The insertion amount of first electrode 30 obtains in advance the relationship between a change state of the current waveform output from ammeter 220 from the initial state and a wear state of first electrode 30 and also determines in advance the moving distance of first electrode 30 to be inserted into treatment tank 12 corresponding to the wear state of first electrode 30. By referring to such information by control device 230, it is possible to drive and control electrode moving device 210 so that first electrode 30 can be inserted into treatment tank 12 by the moving distance of first electrode 30. With such a configuration, it is possible to keep the distance between first electrode 30 and second electrode 31 constant without directly measuring the distance between first electrode 30 and second electrode 31 and plasma generation can be stabilized.

Further, control device 230 sets the determination threshold value as the current value output from ammeter 220, which is equal to or less than the peak current value when the plasma emits light and is equal to or more than the peak current value when the plasma does not emit light. By setting in this manner, if it is determined by control device 230 that the current value output from ammeter 220 falls within the determination threshold value since this means that the plasma emits light, control device 230 can easily determine whether or not the plasma generation is succeeded. In addition, control device 230 can determine that the ratio exceeding the determination threshold value per unit time is the plasma generation ratio. Therefore, in a case where control device 230 determines that the ratio exceeding the determination threshold value per unit time is equal to or less than the desired ratio, the distance between first electrode 30 and second electrode 31 can be controlled to be constant by controlling electrode moving device 210 by control device 230 to send out first electrode 30 toward a side of second electrode 31. As a result, a desired plasma generation ratio can be achieved by a simple method without directly measuring the distance between first electrode 30 and second electrode 31, and plasma generation can be stabilized.

Figure 12A:
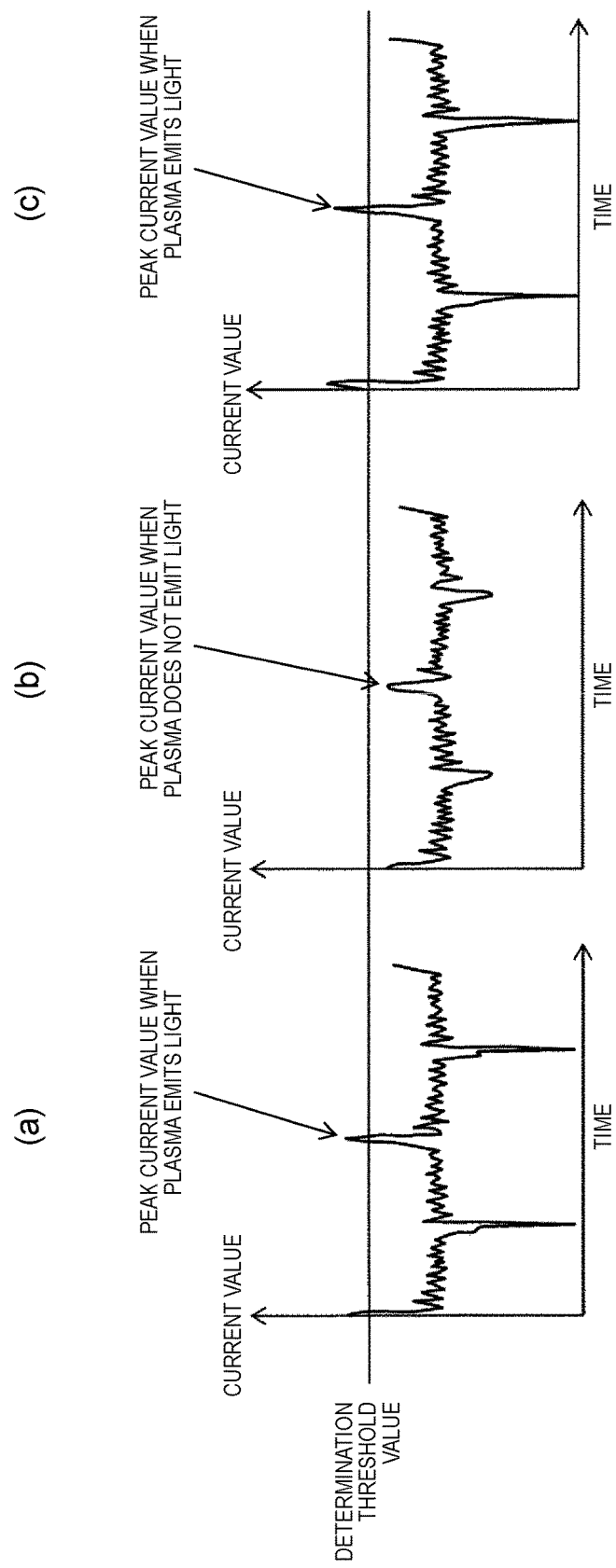
FIG. 12A is current waveform diagrams when the plasma measured by the ammeter emits light.

In the initial state of (a) of FIG. 12A, although the peak current value when the plasma emits light is equal to or more than the determination threshold value, in the worn state of (b) of FIG. 12A, the peak current value when the plasma emits light is equal to or less than the determination threshold value. Accordingly, in a case where the ratio exceeding the determination threshold value becomes equal to or less than the preset value, it is possible for control device 230 to determine that it is in the worn state in (b) of FIG. 12A. In a case where control device 230 determines that it is in the worn state in (b) of FIG. 12A, a control command is given to electrode moving device 210 by control device 230 so that the distance between first electrode 30 and second electrode 31 is controlled. By this control, the peak current value when the plasma emits light can be set to a state after the electrode distance illustrated in (c) of FIG. 12A is controlled to be constant. As described above, in a case where control device 230 determines that the ratio exceeding the determination threshold value is equal to or more than the preset value, the control for making the electrode distance constant by control device 230 is stopped.

Figure 12B:
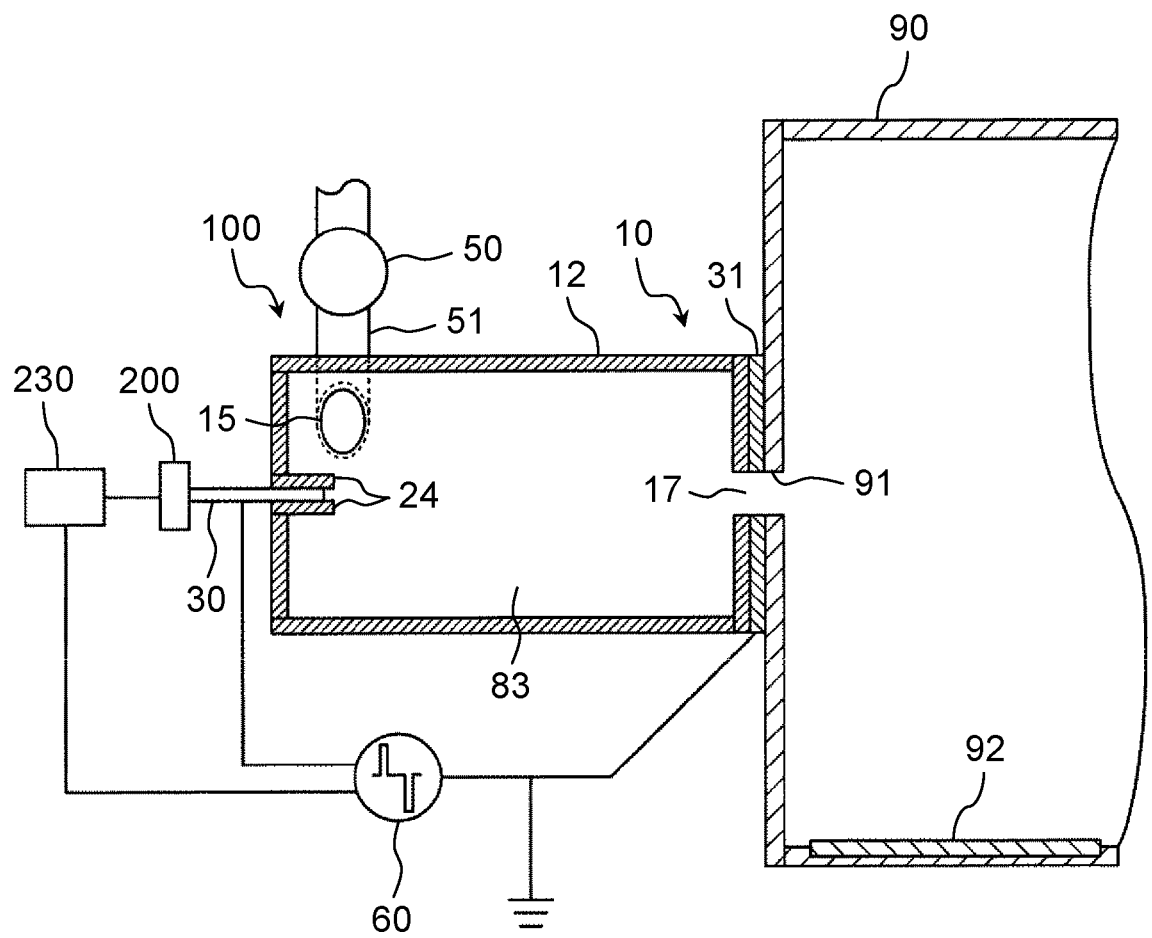
FIG. 12B is a side sectional view in which a copper material is disposed in a portion of a storage tank in a modification example of an apparatus main body.
Figure 13:
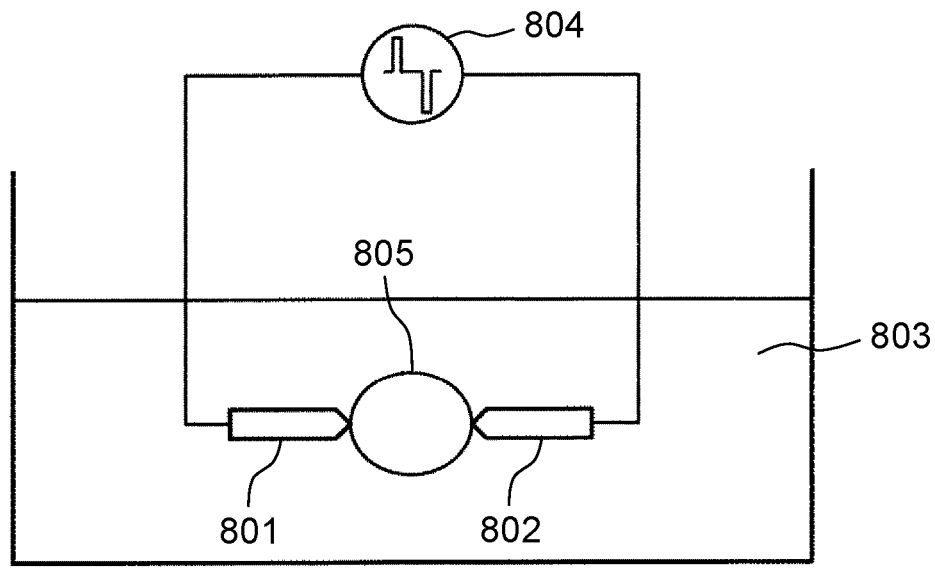
FIG. 13 is a sectional view illustrating a conventional liquid treatment apparatus.
Figure 14:
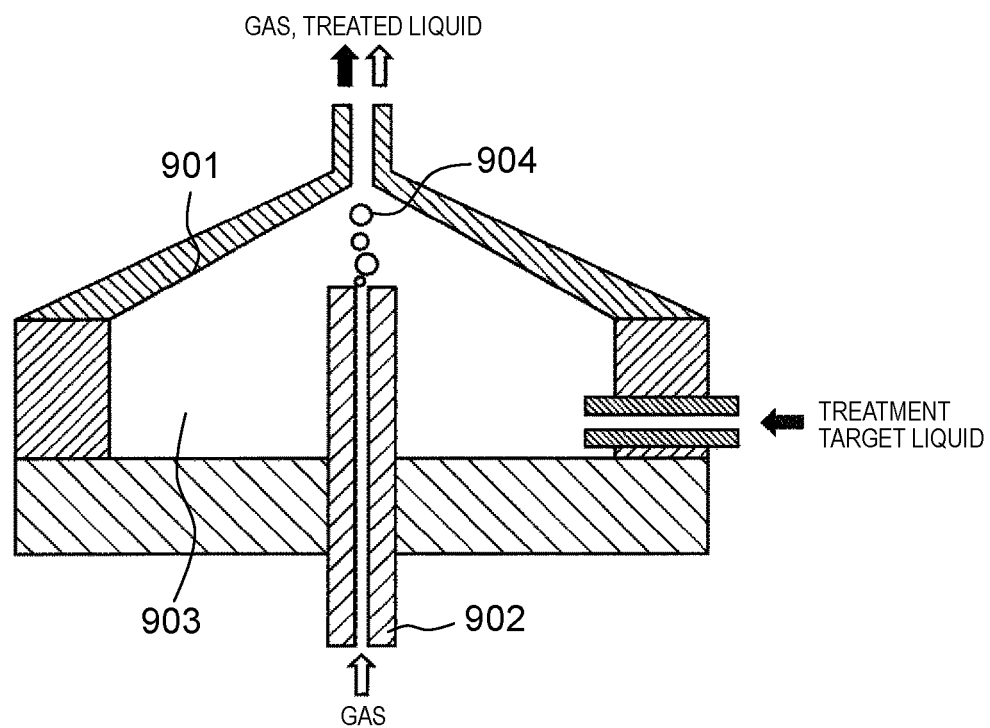
FIG. 14 is a sectional view of a conventional liquid treatment apparatus including a gas introduction device.

In addition, as a material of the material constituting storage tank 90, it is sufficient that water does not permeate. In addition, for example, as illustrated in FIG. 12B, plate member 92 containing copper or iron capable of exhibiting a high sterilization effect by causing a Fenton reaction with hydrogen peroxide water, which is one of the reformed components, can be used for a portion or all of storage tank 90. In addition, plate member 92 may be disposed in storage tank 90 as a separate member from storage tank 90. In short, when plate member 92 comes into contact with the reformed liquid in storage tank 90, it undergoes a Fenton reaction with the hydrogen peroxide water which is one of the reformed components, and it is possible to develop a high sterilization effect.

The configuration of liquid treatment apparatus 100 described in Exemplary embodiment 1 is an example, and various modifications are possible. For example, the internal structure of treatment tank 12, the position of first electrode 30 or second electrode 31, and the like are not limited to the structure of Exemplary embodiment 1. In Exemplary embodiment 1, although first electrode 30 is disposed on the closed end side of tubular treatment tank 12, and second electrode 31 is disposed in the vicinity of discharge unit 17, even in a case where first electrode 30 and second electrode 31 are disposed opposite to each other, the same effect can be obtained.

Although Exemplary embodiment 1 of the disclosure has been described above, the Exemplary embodiment 1 described above is merely an example for implementing the disclosure. Therefore, the disclosure is not limited to Exemplary embodiment 1 described above, and Exemplary embodiment 1 described above can be appropriately modified and implemented without departing from the spirit thereof.

In other words, by combining any of Exemplary embodiments or modification examples of the various Exemplary embodiments or modification examples, it is possible to achieve the effect each of them has. In addition, combinations of the Exemplary embodiments or combinations of the examples or combinations of the Exemplary embodiments and the examples are possible and combinations of features in different Exemplary embodiments or examples are also possible.

INDUSTRIAL APPLICABILITY

Since the liquid treatment apparatus according to the above aspect of the disclosure can maintain the distance between two electrodes constant by rotating the electrodes, it is possible to efficiently generate plasma to rapidly treat the liquid and to stably generate the plasma for a long time. Therefore, the liquid treatment apparatus according to the aspect of the disclosure can treat liquid by simultaneously causing a decomposing and sterilizing action by generating plasma in the liquid and pollutants or bacteria contained in the liquid directly coming in contact with the plasma and a decomposing and sterilizing action by ultraviolet rays, radicals, or the like generated by plasma discharge. Therefore, this treatment liquid can be used for sterilization, deodorization, various environmental improvement, or the like.

REFERENCE MARKS IN THE DRAWINGS

100 LIQUID TREATMENT APPARATUS
10 APPARATUS MAIN BODY
12 TREATMENT TANK
121 TREATMENT TANK
122 TREATMENT TANK
15 INTRODUCTION PORTION (LIQUID INTRODUCTION PORT)
17 DISCHARGE UNIT
21 FIRST INNER WALL

22 SECOND INNER WALL
23 THIRD INNER WALL
24 ELECTRODE SUPPORT TUBE
30 FIRST ELECTRODE
30a TIP PORTION
30b LOWER SIDE OF TIP PORTION
30c CENTRAL AXIS (CENTRAL AXIS OF FIRST ELECTRODE)
30d OPPOSITE SIDE OF TIP PORTION
31 SECOND ELECTRODE
50 LIQUID SUPPLIER
51 PIPE
53 INSULATOR
60 POWER SUPPLY
80 WATER TANK
81 ONE-DOT CHAIN LINE (PIPE FOR CIRCULATION)
83 ACCOMMODATION SPACE
90 STORAGE TANK
151 OPENING END
200 ROTATION MECHANISM (ELECTRODE ROTATION DEVICE)
210 ELECTRODE MOVING DEVICE
211 MOTOR
212 BALL SCREW
213 MOVABLE BODY
220 AMMETER
230 CONTROL DEVICE
241 INNER END SURFACE
301 RIGHT END PORTION
311 OPENING PORTION
801 FIRST ELECTRODE
802 SECOND ELECTRODE
803 LIQUID
804 PULSE POWER SUPPLY
805 PLASMA
901 ANODE ELECTRODE
902 CATHODE ELECTRODE
903 TREATMENT LIQUID
904 GAS
BA BUBBLE
F1 SWIRLING FLOW
G GAS PHASE
L1 LIQUID
L2 TREATMENT LIQUID
P PLASMA
X1 CENTRAL AXIS

The invention claimed is:

1. A liquid treatment apparatus comprising:
a tubular treatment tank having a sectional shape orthogonal to a central axis of the tank, the sectional shape being a circular shape,
the tubular treatment tank including a first end that is closed and a liquid introduction port for introducing a liquid to be treated from a tangential direction of the circular sectional shape in the vicinity of the closed end, and causing the liquid to swirl about the central axis to generate a gas phase in a swirling flow of the liquid;
a first electrode disposed on a side of the first end of the treatment tank, the first electrode being rod-shaped;
a second electrode disposed on a side of a second end of the treatment tank;
a power supply for applying a voltage between the first electrode and the second electrode to generate plasma; and
an electrode rotation device for rotating the first electrode so that a tip of the first electrode is evenly worn about a central axis of the first electrode.

2. The liquid treatment apparatus of claim 1, further comprising:
an ammeter connected between the first electrode and the second electrode; and
an electrode moving device which changes a distance between the first electrode and the second electrode based on a current value measured by the ammeter.

3. The liquid treatment apparatus of claim 2, further comprising:
a control device configured to drive and control the electrode moving device so as to change the distance between the first electrode and the second electrode in a case where a determination threshold value is equal to or less than a peak current value when the generated plasma emits light, and the determination threshold value is set to be equal to or more than the peak current value when the generated plasma does not emit light, and it is determined that a ratio of the determination threshold value per unit time exceeding the current value becomes equal to or less than a preset ratio.

4. The liquid treatment apparatus of claim 1, wherein the electrode rotation device rotates the first electrode about the central axis of the first electrode by at least 45 degrees.

5. The liquid treatment apparatus of claim 1, wherein the electrode rotation device continuously rotates the first electrode about the central axis of the first electrode.

6. The liquid treatment apparatus of claim 2, wherein the electrode rotation device rotates the first electrode about the central axis of the first electrode by at least 45 degrees.

7. The liquid treatment apparatus of claim 2, wherein the electrode rotation device continuously rotates the first electrode about the central axis of the first electrode.

8. The liquid treatment apparatus of claim 3, wherein the electrode rotation device rotates the first electrode about the central axis of the first electrode by at least 45 degrees.

9. The liquid treatment apparatus of claim 3, wherein the electrode rotation device continuously rotates the first electrode about the central axis of the first electrode.

* * * * *